C. H. LAKE.
METHOD OF AND APPARATUS FOR TESTING CORSETS.
APPLICATION FILED JUNE 22, 1916.
1,211,598.
Patented Jan. 9, 1917.
2 SHEETS—SHEET 1.
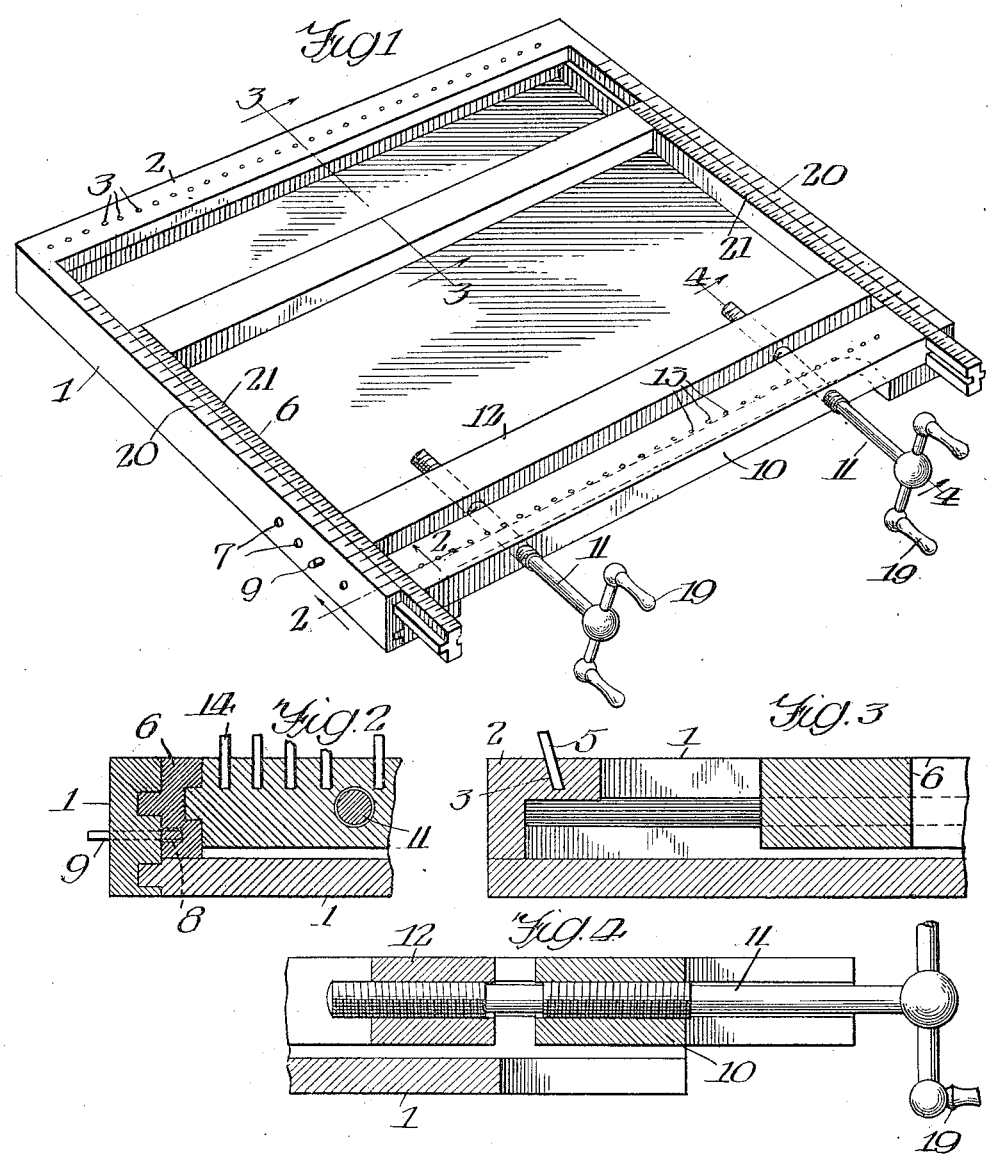
Witnesses:
N. G. Barrett
Ernest H. Merchant
Inventor
Cora H. Lake
By Wm. J. Belknap

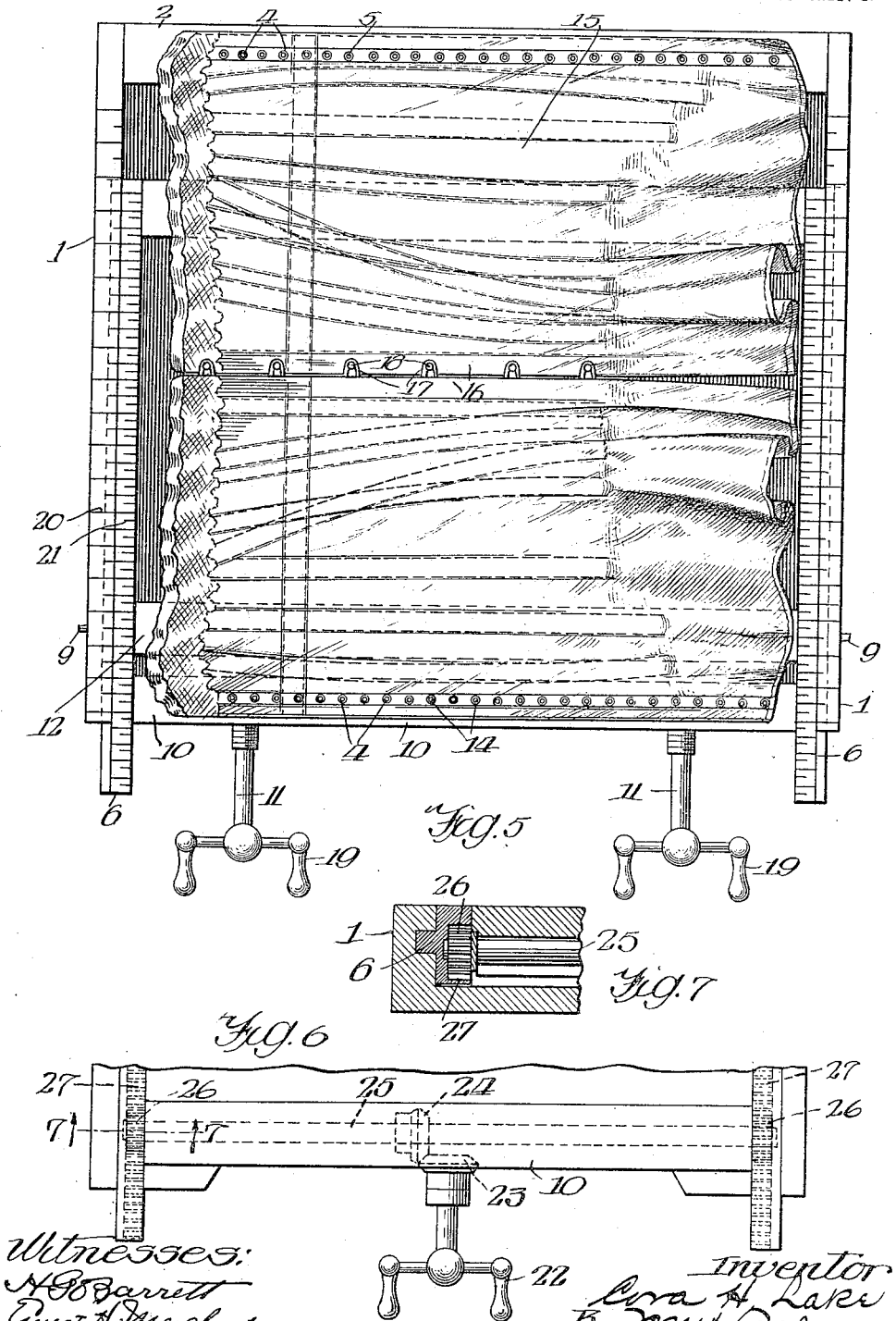

UNITED STATES PATENT OFFICE.

CORA H. LAKE, OF CHICAGO, ILLINOIS.

METHOD OF AND APPARATUS FOR TESTING CORSETS.

1,211,598. Specification of Letters Patent. Patented Jan. 9, 1917.

Application filed January 22, 1916. Serial No. 73,542.

*To all whom it may concern:*

Be it known that I, CORA H. LAKE, a citizen of the United States, residing at Chicago, in the county of Cook and State of Illinois, have invented certain new and useful Improvements in Methods of and Apparatus for Testing Corsets, of which the following is a specification.

This invention relates to a method of and apparatus for testing corsets for the purpose of discovering the presence of certain imperfections which cause these garments to be uncomfortable to the wearer.

As is well understood by those skilled in the art it is essential to a perfect corset that the steels at the edges of the sections thereof be in exact parallel alinement so that when the corset is applied to a symmerical figure the front steels, which are connected in back-lacing corsets by studs and loops, will extend along the medial line of the figure while the rear steels are equidistant from each other. While manufacturers have long understood this principle and have striven to attain perfection therein they have not heretofore been provided with a suitable method of or apparatus for testing a corset to determine the presence of imperfections resulting in a lack of parallelism of the steels.

It is the object, therefore, of my invention to provide a simple method of and apparatus for testing corsets whereby the parallelism of the steels can be readily determined by relatively unskilled persons.

Further objects and advantages of my invention will be apparent as it is better understood by reference to the following specification when read in connection with the accompanying drawing, illustrating preferred embodiments thereof, in which—

Figure 1 is a view in perspective of an apparatus adapted for use in carrying out my method; Fig. 2 is an enlarged vertical section on the line 2—2 of Fig. 1; Fig. 3 is an enlarged vertical section on the line 3—3 of Fig. 1; Fig. 4 is an enlarged vertical section on the line 4—4 of Fig. 1; Fig. 5 is a plan view illustrating the manner of using my invention; Fig. 6 is a plan view of a portion of the apparatus illustrating a slightly different means for operating the movable bar, and Fig. 7 is a vertical section on the line 7—7 of Fig. 6.

As previously stated it is essential to a perfect fitting corset that the steels at the edges of the sections thereof be in absolute parallel alinement. In order to determine whether or not this condition exists in the finished corset I have devised a method which consists in securing one edge of each of the two sections of a corset in contiguous parallel relation. In a back-lacing corset this is accomplished by attaching the two sections by means of studs and loops secured to the front steels. The free edges of the corset are then arranged in exactly parallel relation, spaced from each other a distance equal to the width of the corset, and the corset is stretched or tensioned in a line normal to the free edges while the parallel relation of the latter is maintained. When the corset has been stretched the contiguous edges will be disposed in a line which, if the corset is properly constructed, will be parallel to the spaced free edges, whereas if imperfections exist resulting from improper stitching or otherwise the contiguous edges will assume a direction which is not parallel to the spaced free edges and the corset should be discarded since it can not be made to fit properly.

In the drawings I have illustrated a simple and inexpensive apparatus which is well adapted for use in carrying out the above-described method. An outer frame 1 is constructed of wood or other suitable material which is sufficiently rigid to withstand the strains imposed in carrying out my method. One side 2 of the frame 1 is provided with a plurality of spaced openings 3, corresponding to the standard lacing eyelets 4 (Fig. 5), and pins 5 are provided which are adapted to pass through the eyelets out into the openings 3 to secure one of the free edges of a corset to the side 2. A frame 6 is slidably mounted in the frame 1 and is movable in a direction normal to the side 2 thereof. A series of openings 7 and 8 are provided in the ends of the frames 1 and 6 into which pins 9 may be inserted to prevent relative movement between the frames after the primary adjustment thereof to substantially the width of the corset which is tested.

A bar 10 is slidably mounted in the ends of the frame 6 and is adapted to be moved in a direction normal to the side 2 of the frame 1 by means of suitable screws 11 threadedly engaging the bar 10 and a side 12 of the frame 6. The bar 10 is provided with a plurality of spaced openings 13 corresponding to the lacing eyelets 4 of a corset and the openings 3 in the side member 2 of the frame 1. Pins 14 are adapted to be disposed through the eyelets 4 and the openings 13 to secure the free edge of the corset thereto.

The mode of operation of the apparatus above described will be better understood by reference to Fig. 5 of the drawing in which a corset is designated generally by reference character 15, the front steels 16 of which are secured in contiguous parallel relation by the loops 17 and the studs 18. The lacing eyelets 4 are secured to the side 2 of the frame 1 and the bar 10 by the pins 5 and 14 in the manner previously described. After the corset 15 has been thus secured the frames 1 and 6 are moved relatively to space the bar 10 from the side 2 of the frame 1 a distance substantially equal to the width of the corset and the pins 9 are inserted in the openings 7 and 8 to prevent further relative movement of the frames 1 and 6. The screws 11 are then operated by means of suitable handles 19 to stretch the corset 15, the bar 10 being, however, maintained in exact parallel alinement with the side 2 of the frame 1. When the corset has been sufficiently stretched the relation between the contiguous edges, formed by the steels 16, and the outer edges is determined and if the contiguous edges are found to be parallel with the outer edges the corset is perfect. If, however, the contiguous edges assume a position at an angle to the outer edges the corset should be discarded. The ends of the frames 1 and 6 are preferably graduated, as indicated by reference characters 20 and 21, to aid the operator in maintaining the parallelism of the bar 10 to the side 2 of the frame 1 and also in determining the relation of the contiguous edges of the corset to the free edges.

In Figs. 6 and 7 I have illustrated a slightly different arrangement of the operating mechanism for the bar 10 in which a single operating handle 22 is connected to a bevel gear 23, meshing with a bevel pinion 24 on a shaft 25, journaled in suitable bearings in the bar 10 and provided at its extremities with pinions 26 engaging racks 27 fixedly mounted on the ends of the frame 6. With this arrangement the bar 10 is necessarily always moved in exact parallelism with the side 2 of the frame 1 and this structure has a further advantage in that the operator has but a single operating handle to manipulate.

From the foregoing it will be apparent that I have succeeded in perfecting a method of and apparatus for testing corsets which fills a long-felt need in this art and by the use of which it becomes possible for the first time to accurately determine whether or not a corset is correctly constructed. With the aid of my method and apparatus the delivery of imperfect corsets to users thereof is eliminated, since an unskilled person can readily determine whether or not the corset is suitable for use.

My invention makes it possible for manufacturers, particularly of high-grade corsets, to materially improve their product with resulting satisfaction to the users and consequent advantage to the manufacturer.

Although my invention is particularly described and illustrated with reference to a back-lace corset it is equally applicable to corsets of the front-lace type.

It will be further apparent that various changes may be made in the form, construction and arrangement of the parts without departing from the spirit and scope of the invention or sacrificing any of its material advantages, the forms hereinbefore described being merely preferred embodiments thereof.

I claim:

1. A method of testing corsets which comprises securing one edge of each of the two sections of a corset in contiguous parallel relation, maintaining the outer edges in spaced parallel relation, and stretching the corset in a line normal to said outer edges while maintaining the parallel relation thereof, and determining the relation of the said contiguous edges to said outer edges.

2. A method of testing back-lace corsets which comprises securing the front edge of the two sections of a corset in contiguous parallel relation, maintaining the back edges in spaced parallel relation, stretching the corset in a line normal to said back edges while maintaining the parallel relation thereof, and determining the relation of said front edges to said back edges.

3. In an apparatus for testing corsets, means to which the outer edges of a corset may be secured, means for maintaining said first-mentioned means in parallel spaced relation, whereby the corset is stretched in a line normal to its outer edges and means whereby the relation of the contiguous edges of the corset to said outer edges may be readily determined.

4. In an apparatus for testing corsets, a pair of relatively movable bars, each provided with means for securing the outer edges of a corset thereto, means for separating and maintaining said bars in parallel spaced relation, whereby the corset is stretched in a line normal to its outer edges, and means whereby the relation of the contiguous edges of the corset to said outer edges may be readily determined.

5. In an apparatus for testing corsets, a pair of relatively movable bars, each provided with a plurality of spaced openings corresponding to the eyelets in the outer edges of a corset, pins in said openings adapted to engage said eyelets, means for separating and maintaining said bars in parallel spaced relation, whereby the corset is stretched in a line normal to its outer edges, and means whereby the relation of the contiguous edges of the corset to said outer edges may be readily determined.

6. In an apparatus for testing corsets, a pair of relatively movable frames provided with interengaging guiding means, means for securing said frames to prevent relative movement therebetween, means on one side of one of said frames to secure an outer edge of a corset thereto, a member supported on and guided by the other frame in movable relation thereto and provided with means for securing the remaining outer edge of the corset to said member, and means for maintaining said member in parallel spaced relation to said side of the first mentioned frame, whereby the corset is stretched in a line normal to its free edges and the relation of the contiguous edges of the corset to said outer edges may be readily determined.

7. In an apparatus for testing corsets, a frame having means on one of its sides for securing one of the outer edges of a corset thereto, a second frame provided with guiding means engaging said first-mentioned frame and movable in a direction normal to said side, means for securing said frames to prevent relative movement therebetween, a bar supported by said second frame in movable relation thereto and provided with means for securing the remaining outer edge of the corset thereto, and means for moving said bar with respect to said second frame and maintaining it in parallel spaced relation to said side of the first frame, whereby the corset is stretched in a line normal to its free edges and the relation of the contiguous edges of the corset to said outer edges may be readily determined.

CORA H. LAKE.

Witnesses:
WM. F. BELT,
M. A. KIDDIE.

Copies of this patent may be obtained for five cents each, by addressing the "Commissioner of Patents. Washington, D. C."